United States Patent
Han et al.

(10) Patent No.: US 7,839,929 B2
(45) Date of Patent: Nov. 23, 2010

(54) METHOD AND APPARATUS FOR PREDECODING HYBRID BITSTREAM

(75) Inventors: Woo-jin Han, Suwon-si (KR); Kyo-hyuk Lee, Seoul (KR); Bae-keun Lee, Bucheon-si (KR); Jae-young Lee, Suwon-si (KR); Sang-chang Cha, Hwaseong-si (KR); Ho-jin Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1436 days.

(21) Appl. No.: 11/251,869

(22) Filed: Oct. 18, 2005

(65) Prior Publication Data

US 2006/0083302 A1    Apr. 20, 2006

Related U.S. Application Data

(60) Provisional application No. 60/619,023, filed on Oct. 18, 2004.

(30) Foreign Application Priority Data

Jan. 25, 2005    (KR) .................... 10-2005-0006803

(51) Int. Cl.
H04N 7/12    (2006.01)
H04N 11/02    (2006.01)
(52) U.S. Cl. ................................. 375/240.08
(58) Field of Classification Search .............. None
See application file for complete search history.

(56) References Cited

U.S. PATENT DOCUMENTS

| | | | |
|---|---|---|---|
| 5,416,521 A * | 5/1995 | Chujoh et al. ........... | 375/240.14 |
| 5,754,241 A * | 5/1998 | Okada et al. ........... | 375/240.05 |
| 6,263,022 B1 | 7/2001 | Chen et al. | |
| 6,292,512 B1 * | 9/2001 | Radha et al. ............ | 375/240.1 |
| 6,529,552 B1 * | 3/2003 | Tsai et al. .............. | 375/240.05 |
| 6,580,754 B1 | 6/2003 | Wan et al. | |

(Continued)

FOREIGN PATENT DOCUMENTS

WO    0139503 A1    5/2001

OTHER PUBLICATIONS

ISO/IEC JTC1/SC29/WG11, "Description of Core Experiments in MPEG-21 Scalable Video Coding", MPEG Document N6521, Redmond, Jul. 2004.

(Continued)

*Primary Examiner*—Yuzhen Ge
(74) *Attorney, Agent, or Firm*—Sughrue Mion, PLLC

(57) ABSTRACT

A method and apparatus for efficiently predecoding a hybrid bitstream generated by a plurality of coding schemes are provided. The method includes obtaining a first bit-rate for a boundary between the lower layer bitstream and the upper layer bitstream and a second bit-rate for a boundary between motion information and texture information of the upper layer bitstream from the input hybrid bitstream, determining the target bit-rate according to variable network circumstances, and when the target bit-rate is between the first and second bit-rates, skipping the motion information of the upper layer bitstream and truncating all bits of the texture information of the upper layer bitstream from the tail, except bits corresponding to the difference between the target bit-rate and the first bit-rate.

7 Claims, 13 Drawing Sheets

U.S. PATENT DOCUMENTS

| | | | |
|---|---|---|---|
| 6,639,943 | B1 | 10/2003 | Radha et al. |
| 6,728,317 | B1 | 4/2004 | Demos |
| 6,771,703 | B1 | 8/2004 | Oguz et al. |
| 6,795,498 | B1 * | 9/2004 | Kato et al. ............. 375/240.01 |
| 6,836,512 | B2 * | 12/2004 | Van Der Schaar et al. ..................... 375/240.11 |
| 7,020,193 | B2 * | 3/2006 | Van Der Schaar ...... 375/240.01 |
| 7,068,718 | B2 * | 6/2006 | Kim et al. .............. 375/240.02 |
| 7,095,782 | B1 * | 8/2006 | Cohen et al. ........... 375/240.01 |
| 7,203,238 | B2 * | 4/2007 | Liu et al. ............... 375/240.17 |
| 7,272,299 | B2 * | 9/2007 | Notoya et al. ................. 386/95 |
| 7,317,759 | B1 * | 1/2008 | Turaga et al. .......... 375/240.01 |
| 2001/0024470 | A1 * | 9/2001 | Radha et al. ............. 375/240.1 |
| 2002/0071654 | A1 * | 6/2002 | Notoya et al. ................. 386/65 |
| 2002/0118742 | A1 | 8/2002 | Puri et al. |
| 2003/0002579 | A1 | 1/2003 | Radha et al. |
| 2005/0008240 | A1 * | 1/2005 | Banerji et al. ............... 382/238 |

OTHER PUBLICATIONS

H. Schawarz, et al., "Scalable Extension of H.264/AVC", M10569, Munich, Mar. 2004.
Ho-Jin Ha, et al., "Responses of CE1d: Base-Layer", MPEG Document M11055, Redmond, Jul. 2004.
K. Hanke, "Response to SVC CE1e—Spatial Highpass Transition Filtering", ISO/IEC JTC1/SC29/WG11, MPEG doc. M11011, Redmond, Jul. 2004.
Jae-Young Lee, et al., "Responses of CE1e: Deblocking", MPEG Document M11056, Redmond, Jul. 2004.
Won-Ha Kim, et al. "Interframe Wavelet Video Coding with Frame Adaptive Spatial Wavelet", MPEG Document M10323, Hawaii, Jul. 2004.
Tsai S. Sam, et al, "Motion information scalability for MC-EZBC" Signal Processing: Image Communication, Elsevier Science Publishers, Aug. 2004 vol. 19, No. 7, pp. 675-684, Amsterdam, NL.
Barbarien J. et al, "Scalable motion vector coding" Electronics Letters, Jul. 22, 2004, pp. 932-934, vol. 40, No. 15, pp. 932-934, IEE Stevenage, GB.

* cited by examiner

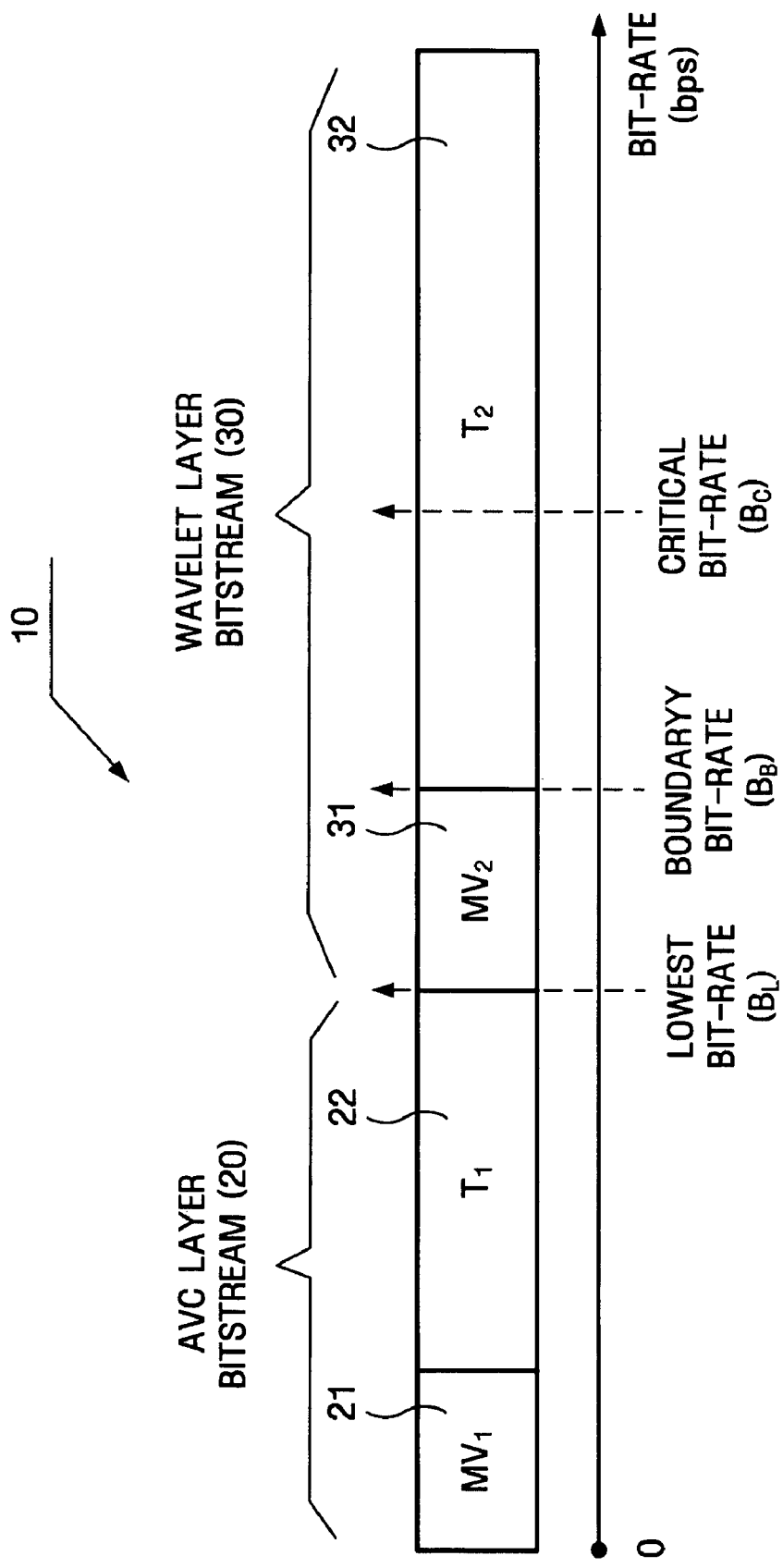

ns. The use of only two
layers can achieve various visual qualities but not provide
high video coding performance at each visual quality.

METHOD AND APPARATUS FOR PREDECODING HYBRID BITSTREAM

CROSS-REFERENCE TO RELATED APPLICATIONS

This application claims priority from Korean Patent Application No. 10-2005-0006803 filed on Jan. 25, 2005 in the Korean Intellectual Property Office, and U.S. Provisional Patent Application No. 60/619,023 filed on Oct. 18, 2004 in the United States Patent and Trademark Office, the disclosures of which are incorporated herein by reference in their entirety.

BACKGROUND OF THE INVENTION

1. Field of the Invention

Apparatuses and methods consistent with the present invention relate to a multi-layer video coding technique, and more particularly, to predecoding a hybrid bitstream generated by a plurality of coding schemes.

2. Description of the Related Art

Development of information communication technologies including the Internet has led to an increase of video communication. However, consumers have not been satisfied with existing text-based communication schemes. To satisfy the consumers, multimedia data containing a variety of information including text, picture, music and the like has been increasingly provided. Multimedia data is usually voluminous such that it requires a storage medium having a large capacity. Also, a wide bandwidth is required for transmitting the multimedia data. For example, a picture of 24 bit true color having a resolution of 640×480 needs the capacity of 640×480×24 per frame, namely, data of approximately 7.37 Mbits. In this respect, a bandwidth of approximately 1200 Gbits is needed so as to transmit this data at 30 frames/second, and a storage space of approximately 1200 Gbits is needed so as to store a movie having a length of 90 minutes. Taking this into consideration, it is necessary to use a compressed coding scheme in transmitting multimedia data including text, picture or sound.

A basic principle of data compression is to eliminate redundancy between the data. Data redundancy implies three types of redundancies: spatial redundancy, temporal redundancy, and perceptional-visual redundancy. Spatial redundancy refers to duplication of identical colors or objects in an image, temporal redundancy refers to little or no variation between adjacent frames in a moving picture frame or successive repetition of same sounds in audio, and perceptional-visual redundancy refers to dullness of human vision and sensation to high frequencies. By eliminating these redundancies, data can be compressed.

FIG. 1 shows an environment in which video compression is applied. Original video data is compressed by a video encoder 1. Currently known Discrete Cosine Transform (DCT)-based video compression algorithms are MPEG-2, MPEG-4, H.263, and H.264. In recent years, research into wavelet-based scalable video coding has been actively conducted. Compressed video data is sent to a video decoder 3 via a network 2. The video decoder 3 decodes the compressed video data to reconstruct original video data.

The video encoder 1 compresses the original video data to not exceed the available bandwidth of the network 2 in order for the video decoder 3 to decode the compressed data. However, communication bandwidth may vary depending on the type of the network 2. For example, the available communication bandwidth of an Ethernet is different from that of a wireless local area network (WLAN). A cellular communication network may have a very narrow bandwidth. Thus, research is being actively conducted into a method for generating video data compressed at various bit-rates from the same compressed video data, in particular, scalable video coding.

Scalable video coding is a video compression technique that allows video data to provide scalability. Scalability is the ability to generate video sequences at different resolutions, frame rates, and qualities from the same compressed bitstream. Temporal scalability can be provided using Motion Compensation Temporal filtering (MCTF), Unconstrained MCTF (UMCTF), or Successive Temporal Approximation and Referencing (STAR) algorithm. Spatial scalability can be achieved by a wavelet transform algorithm or multi-layer coding that has been actively studied in recent years. Signal-to-Noise Ratio (SNR) scalability can be obtained using Embedded ZeroTrees Wavelet (EZW), Set Partitioning in Hierarchical Trees (SPIHT), Embedded ZeroBlock Coding (EZBC), or Embedded Block Coding with Optimized Truncation (EBCOT).

Multi-layer video coding algorithms have recently been adopted for scalable video coding. While conventional multi-layer video coding usually uses a single video coding algorithm, increasing attention has been recently directed to multi-layer video coding using a plurality of video coding algorithms.

FIGS. 2 and 3 illustrate the structures of bitstreams generated by conventional multi-layer video coding schemes. FIG. 2 illustrates a method of generating and arranging a plurality of Advanced Video Coding (AVC) layers at different resolutions, frame rates, and bit-rates. Of course, each layer is efficiently predicted and compressed using information from another layer. Referring to FIG. 2, multiple AVC layers are encoded at different resolutions of QCIF to SD, different frame rates of 15 Hz to 60 Hz, and different bit-rates of 32 Kbps to 3.0 Mbps, thereby achieving a wide variety of visual qualities. However, the method shown in FIG. 2 may reduce redundancy to some extent through interlayer prediction but suffer an increase in bitstream size because an AVC layer is generated for each visual quality.

FIG. 3 shows an example of a bitstream including an AVC base layer and a wavelet enhancement layer. Here, the wavelet enhancement layer has different resolutions from QCIF to SD because wavelet transform supports decomposition of an original image at various resolutions. The wavelet enhancement layer that is subjected to embedded quantization can also be encoded at bit-rates of 32 Kbps to 3.0 Mbps by arbitrarily truncating a bitstream from the tail. Further, when a hierarchical method such as MCTF is used for temporal transformation, the structure shown in FIG. 3 can provide various frame rates from 15 Hz to 60 Hz. The use of only two layers can achieve various visual qualities but not provide high video coding performance at each visual quality.

FIG. 4 is a graph illustrating Peak Signal-to-Noise Ratio (PSNR) with respect to a bit-rate for AVC and wavelet coding. As evident from FIG. 4, wavelet coding exhibits high performance at high bit-rate or resolution while providing low performance at low bit-rate or resolution. Conversely, AVC provides good performance at a low bit-rate. Thus, the use of a bitstream including two layers for each resolution (hereinafter referred to as an 'AVC-wavelet hybrid bitstream') is proposed. That is, an upper layer ('wavelet layer') is encoded using wavelet coding at specific resolution while a lower layer ('AVC layer') is encoded using AVC. Thus, the AVC layer is used for a low bit-rate while the wavelet layer is used for a high bit-rate. Because the wavelet layer is quantized using embedded quantization, it can be encoded at various bit-rates by randomly truncating a bitstream from the tail. A bit-rate must be suitably allocated to the lower layer, i.e., AVC layer, to ensure a minimum data rate necessary for circumstances. Alternatively, as shown in FIG. 4, a critical bit-rate Bc can be allocated to provide optimum performance of an AVC-wavelet hybrid bitstream.

FIG. 5 illustrates a multi-layer coding method using two different coding algorithms for each resolution. Here, a video encoder uses both an AVC coding algorithm offering excellent coding efficiency and a wavelet coding technique providing excellent scalability. While the bitstream shown in FIG. 3 has only two layers, i.e., wavelet layer and AVC layer, the bitstream shown in FIG. 5 includes complex layers, i.e., a wavelet layer and an AVC layer for each resolution. In this way, the wavelet layer is not used for implementation of resolution scalability but is used for implementation of SNR scalability. To provide temporal scalability, MCTF or UMCTF may be used.

To adjust a bit-rate for an AVC-wavelet hybrid bitstream, texture data in a wavelet layer bitstream containing the texture data and motion data can be truncated from the tail. When there is no more texture data to truncate, the entire motion data should be truncated because the motion data is not scalable. However, it is not desirable to maintain motion data when there is little texture data when implementing SNR scalability. Therefore, there is a need to develop a method for adjusting a SNR scale suitable for an AVC-wavelet hybrid bitstream.

SUMMARY OF THE INVENTION

The present invention provides a method and apparatus for efficiently adjusting a signal-to-noise ratio (SNR) scale in a bitstream including two layers encoded using two different coding algorithms.

The present invention also provides a method and apparatus for adjusting a SNR scale considering texture data as well as motion data.

According to an aspect of the present invention, there is provided a method for predecoding a hybrid bitstream including a lower layer bitstream and an upper layer bitstream obtained by encoding a video with a predetermined resolution according to a target bit-rate, the method including obtaining a first bit-rate for a boundary between the lower layer bitstream and the upper layer bitstream and a second bit-rate for a boundary between motion information and texture information of the upper layer bitstream from the input hybrid bitstream, determining the target bit-rate according to variable network circumstances; and when the target bit-rate is between the first and second bit-rates, skipping the motion information of the upper layer bitstream and truncating all bits of the texture information of the upper layer bitstream from the tail, except bits corresponding to the difference between the target bit-rate and the first bit-rate.

According to another aspect of the present invention, there is provided a method for predecoding a hybrid bitstream including a lower layer bitstream and an upper layer bitstream obtained by encoding a video with a predetermined resolution according to a target bit-rate, the method including obtaining a first bit-rate for a boundary between the lower layer bitstream and the upper layer bitstream from the input hybrid bitstream, determining the target bit-rate according to variable network circumstances, determining a critical bit-rate used to determine whether to skip motion information of the upper layer bitstream, and when the target bit-rate is between the first bit-rate and the critical bit-rate, skipping the motion information of the upper layer bitstream and truncating all bits of the texture information of the upper layer bitstream from the tail, except bits corresponding to the difference between the target bit-rate and the first bit-rate.

According to still another aspect of the present invention, there is provided an apparatus for predecoding a hybrid bitstream including a lower layer bitstream and an upper layer bitstream obtained by encoding a video with a predetermined resolution according to a target bit-rate, the method including a bitstream parser obtaining a first bit-rate for a boundary between the lower layer bitstream and the upper layer bitstream and a second bit-rate for a boundary between motion information and texture information of the upper layer bitstream from the input hybrid bitstream, a target bit-rate determiner determining the target bit-rate according to variable network circumstances, and a predecoding unit skipping the motion information of the upper layer bitstream and truncating all bits of the texture information of the upper layer bitstream from the tail, except bits corresponding to the difference between the target bit-rate and the first bit-rate when the target bit-rate is between the first and second bit-rates.

According to yet another aspect of the present invention, there is provided an apparatus for predecoding a hybrid bitstream including a lower layer bitstream and an upper layer bitstream obtained by encoding a video with a predetermined resolution according to a target bit-rate, the method including a bitstream parser obtaining a first bit-rate for a boundary between the lower layer bitstream and the upper layer bitstream from the input hybrid bitstream, a target bit-rate determiner determining the target bit-rate according to variable network circumstances, and a predecoding unit determining a critical bit-rate used to determine whether to skip motion information of the upper layer bitstream and skipping the motion information of the upper layer bitstream and truncating all bits of the texture information of the upper layer bitstream from the tail, except bits corresponding to the difference between the target bit-rate and the first bit-rate, when the target bit-rate is between the first bit-rate and the critical bit-rate.

BRIEF DESCRIPTION OF THE DRAWINGS

The above and other aspects of the present invention will become more apparent by describing in detail exemplary embodiments thereof with reference to the attached drawings in which:

FIG. 6 illustrates the structure of a hybrid bitstream according to an exemplary embodiment of the present invention;

DETAILED DESCRIPTION OF EXEMPLARY EMBODIMENTS OF THE INVENTION

Figure 1:
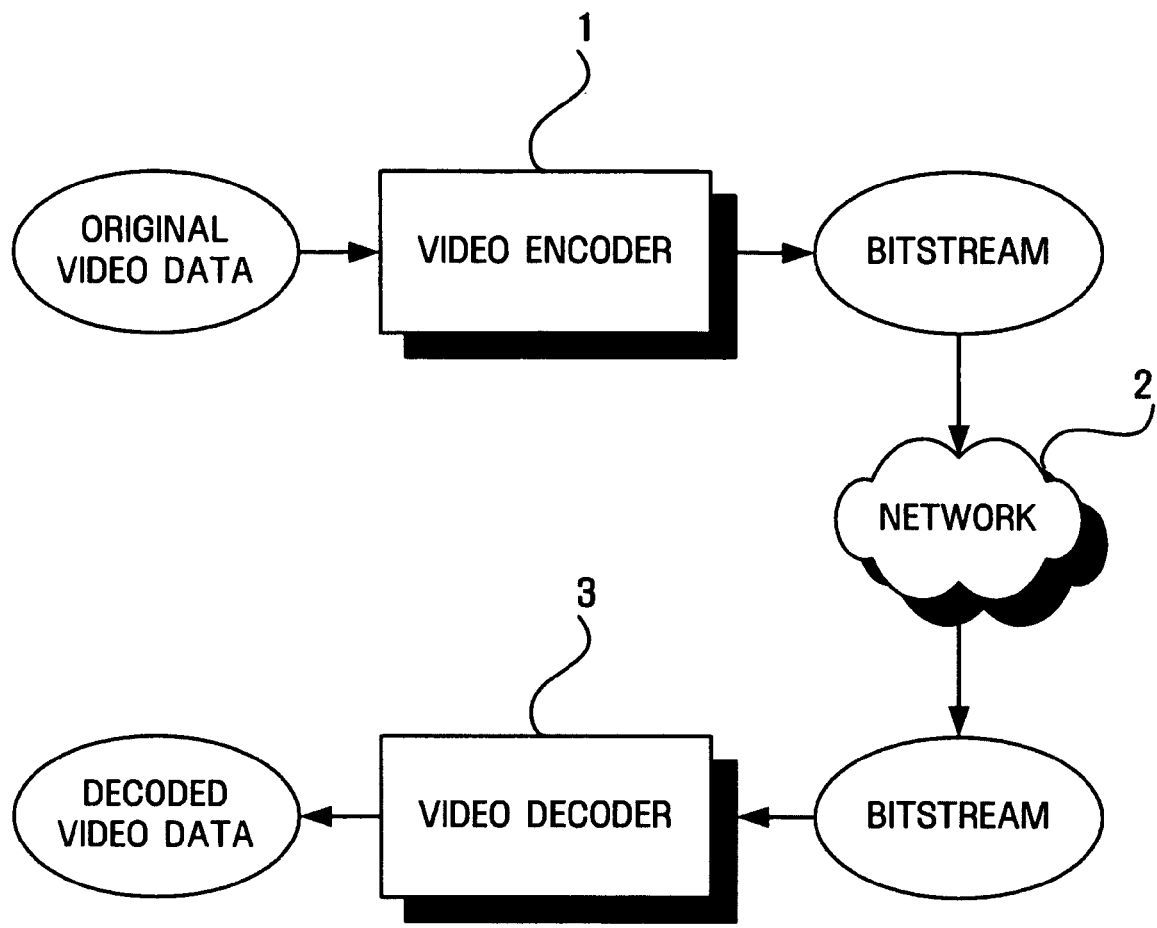
FIG. 1 shows an environment in which video compression is applied.
Figure 2:
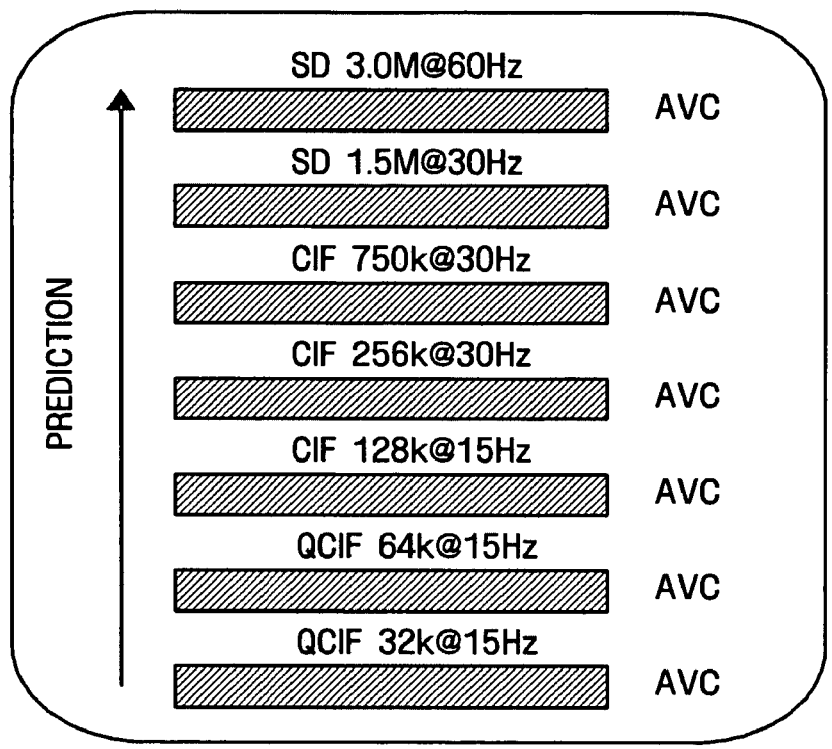
FIG. 2 illustrates conventional multi-layer video coding using a single coding algorithm.
Figure 3:
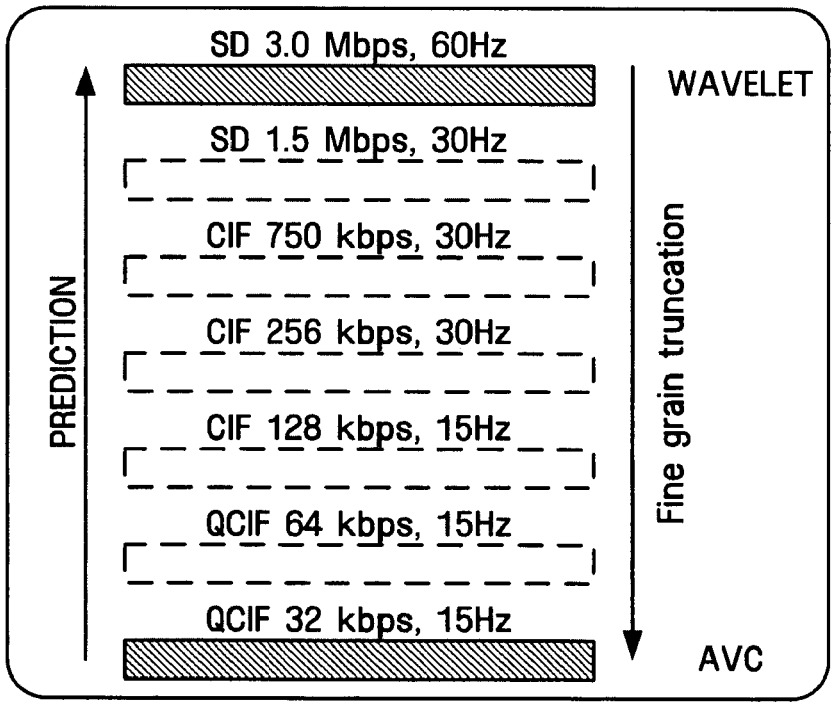
FIG. 3 illustrates conventional multi-layer video coding using two coding algorithms.
Figure 4:
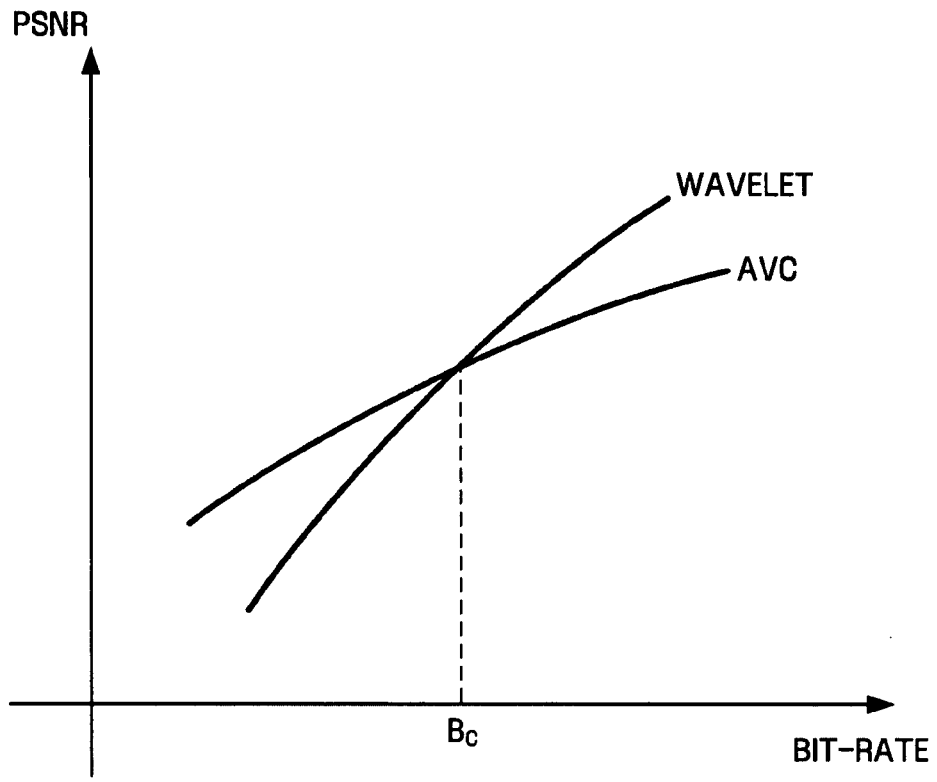
FIG. 4 is a graph illustrating Peak Signal-to-Noise Ratio (PSNR) with respect to a bit-rate for Advanced Video Coding (AVC) and wavelet coding.

The present invention will now be described more fully with reference to the accompanying drawings, in which exemplary embodiments of this invention are shown. Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention proposes a method for efficiently predecoding or truncating a bitstream including a first coding layer (lower layer) and a second coding layer (upper layer) (hereinafter called a 'hybrid bitstream') for each resolution according to a target bit-rate selected depending on variable network situations. The predecoding or truncation refers to a process of cutting off a portion of bitstream according to a target bit-rate in order to represent video data with various bit-rates using the remaining portion.

Figure 5:
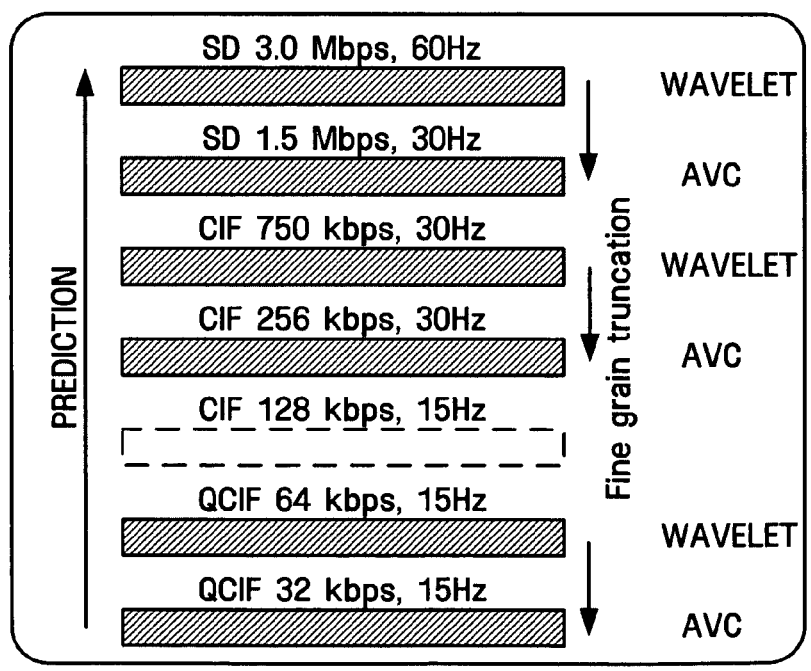
FIG. 5 illustrates conventional multi-layer video coding using two different coding algorithms for each resolution.

The hybrid bitstream can be generated for a plurality of resolutions, respectively, as shown in FIG. 5, or the hybrid bitstream can be generated in a combined manner to represent multi-resolution video data. For convenience of explanation, it will be assumed throughout this specification that a single hybrid bitstream is generated.

The lower layer may be encoded using a video coding scheme providing good coding performance at low bit-rate, such as Advanced Video Coding (AVC) or MPEG-4 coding while the upper layer may be encoded using a video coding scheme offering high coding performance and signal-to-noise ratio (SNR) at high bit-rate, such as wavelet coding technique. The lower layer may have motion vectors with pixel accuracy equal to or lower than those of the upper layer. For example, lower layer motion vectors and upper layer motion vectors may be searched at 1 and ¼ pixel accuracies, respectively. Of course, because redundancy is present between the lower layer motion vector and the upper layer motion vector, the upper layer motion vector in which the redundancy has been removed will be actually encoded.

FIG. 6 illustrates the structure of a hybrid bitstream 10 according to an exemplary embodiment of the present invention. Referring to FIG. 6, the hybrid bitstream 10 consists of an AVC layer bitstream 20 that is a lower layer bitstream and a wavelet layer bitstream 30 that is an upper layer bitstream. The AVC bitstream 20 contains first motion information $MV_1$ 21 and first texture information $T_1$ 22. The wavelet layer bitstream 30 contains second motion information $MV_2$ 31 and second texture information $T_2$ 32. The process of generating the first motion information $MV_1$ 21, the first texture information $T_1$ 22, the second motion information $MV_2$ 31, and the second texture information $T_2$ 32 will be described in detail later with reference to FIG. 9.

While the second texture information $T_2$ can be arbitrarily truncated from the tail according to a target bit-rate, no portion of the second motion information $MV_2$ 31 can be randomly truncated because it is not scalable. The AVC layer bitstream 20 cannot also be randomly truncated to ensure a minimum AVC layer bitstream. regardless of a change in target bit-rate.

FIG. 6 shows bit-rates defined according to positions in the hybrid bitstream 10. As described earlier, the bit-rate of the AVC layer bitstream 20 required to provide a minimum data rate is defined as the lowest bit-rate $B_L$. A bit-rate at a boundary between the second motion information $MV_2$ 31 and the second texture information $T_2$ 32 is called boundary bit-rate $B_B$. That is, the lower layer bitstream in the hybrid bitstream 10 has the lowest bit-rate and the boundary between motion information and texture information in the upper layer bitstream has the boundary bit-rate $B_B$.

A critical bit-rate $B_C$ indicated in the second texture information $T_2$ 32 refers to a bit-rate used to determine whether to skip motion information in the upper layer bitstream in a predecoding method according to a second exemplary embodiment of the present invention that will be described below. A method for determining the critical bit-rate $B_C$ will be described in detail later.

The present invention proposes two predecoding methods. FIGS. 7A-7D illustrate a predecoding method according to a first exemplary embodiment of the present invention and FIGS. 8A-8D illustrate a predecoding method according to a second exemplary embodiment of the present invention. Reference numerals 10 and 40 respectively denote a hybrid bitstream and a predecoded bitstream that is the remaining bitstream obtained after predecoding the hybrid bitstream 10.

Figure 7A:
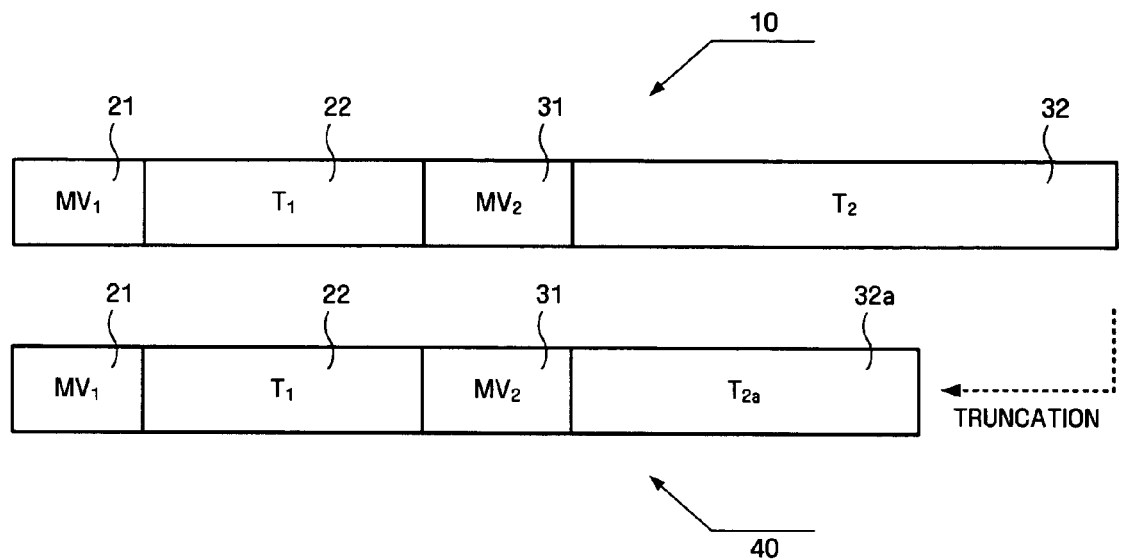
FIGS. 7A-7D illustrate a predecoding method according to a first exemplary embodiment of the present invention.
Figure 7B:
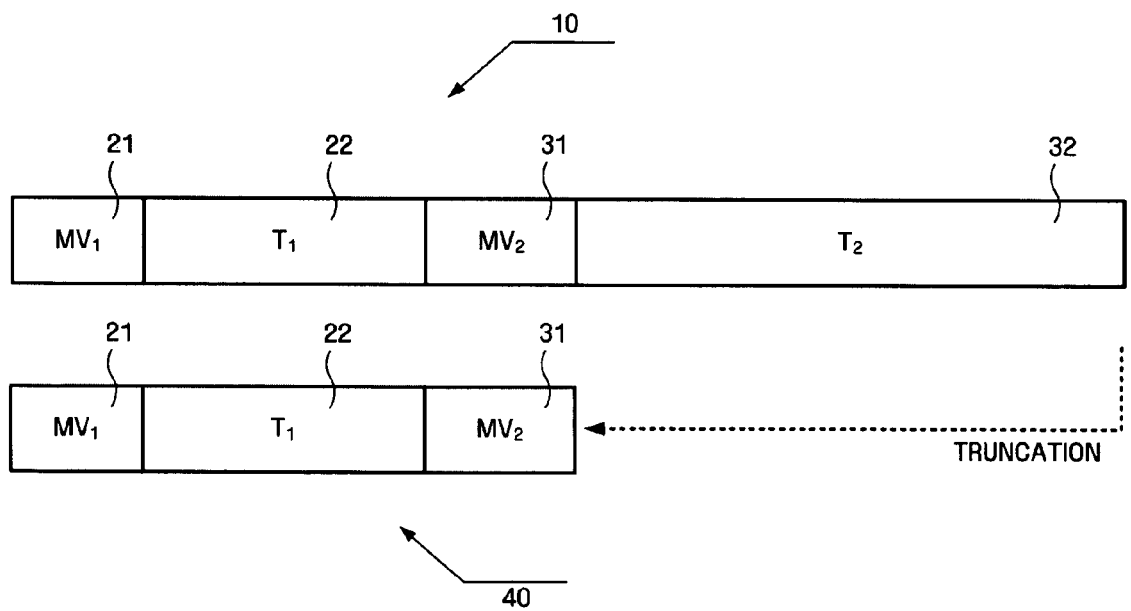
Figure 7C:
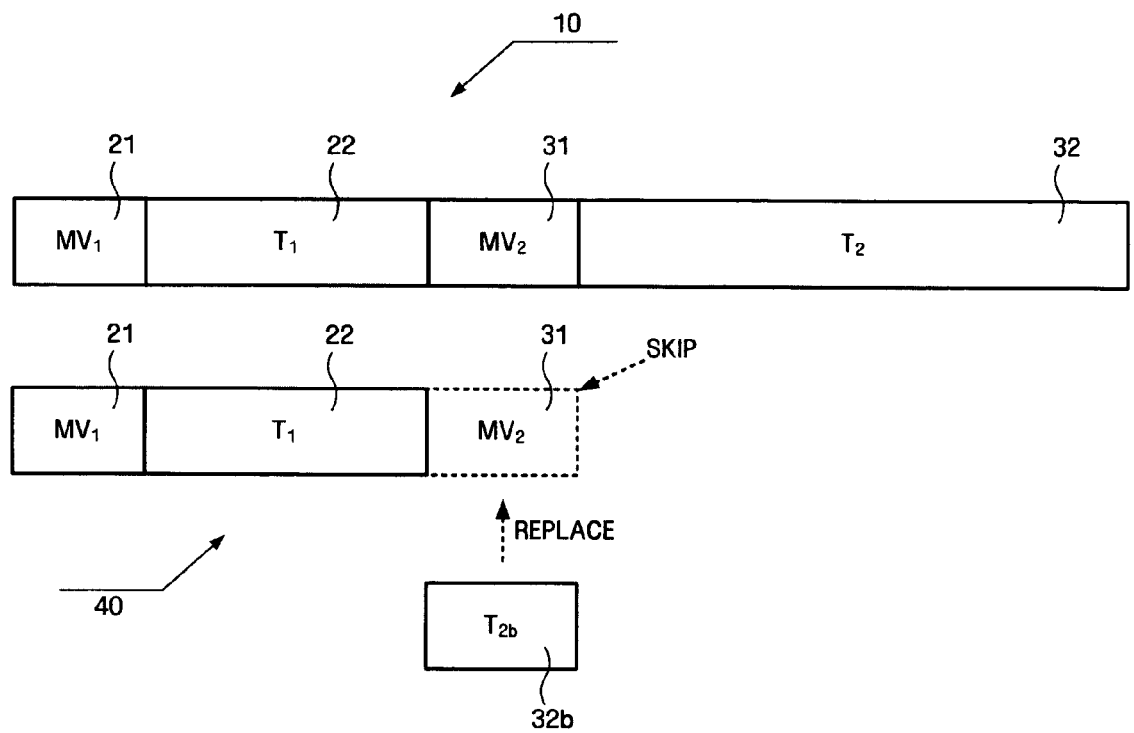

The predecoding method according to the first exemplary embodiment of the present invention will now be described. To match a target bit-rate, $T_2$ 32 of the hybrid bitstream 10 is truncated from the tail as shown in FIG. 7A. The truncation continues until the final bitstream meets the target bit-rate. When the target bit-rate cannot be met even though all bits of $T_2$ 2 are truncated as shown in FIG. 7B, the whole $MV_2$ 31 is skipped as shown in FIG. 7C because the $MV_2$ 31 is non-scalable, thereby saving a bit-rate. The $MV_2$ 31 is replaced with $T_{2b}$ 32b corresponding to the saved bit-rate. Here, $T_{2b}$ 32b corresponds to the front portion of the texture information $T_2$ 32 having the size of $MV_2$ 31.

Figure 7D:
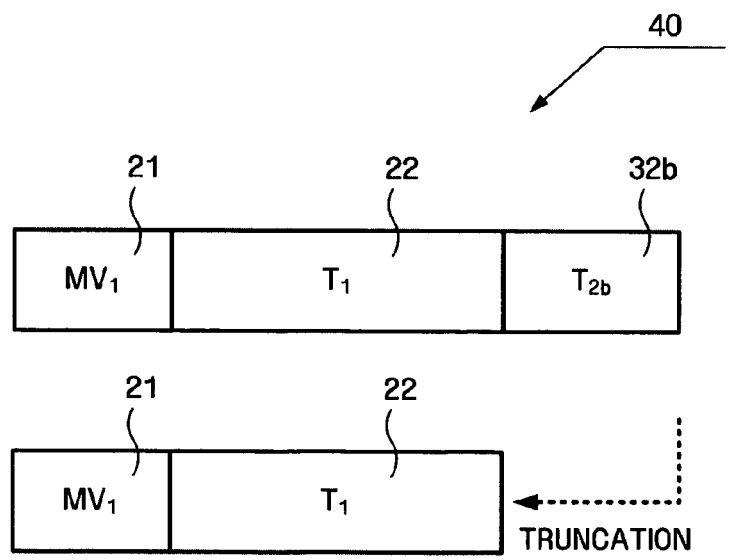

Then, the inserted $T_{2b}$ 32b can be truncated from the tail and this truncation continues until all bits of $T_{2b}$ 32b are cut off as shown in FIG. 7D because the $MV_1$ 21 and $T_1$ 22 cannot be truncated.

Figure 8A:
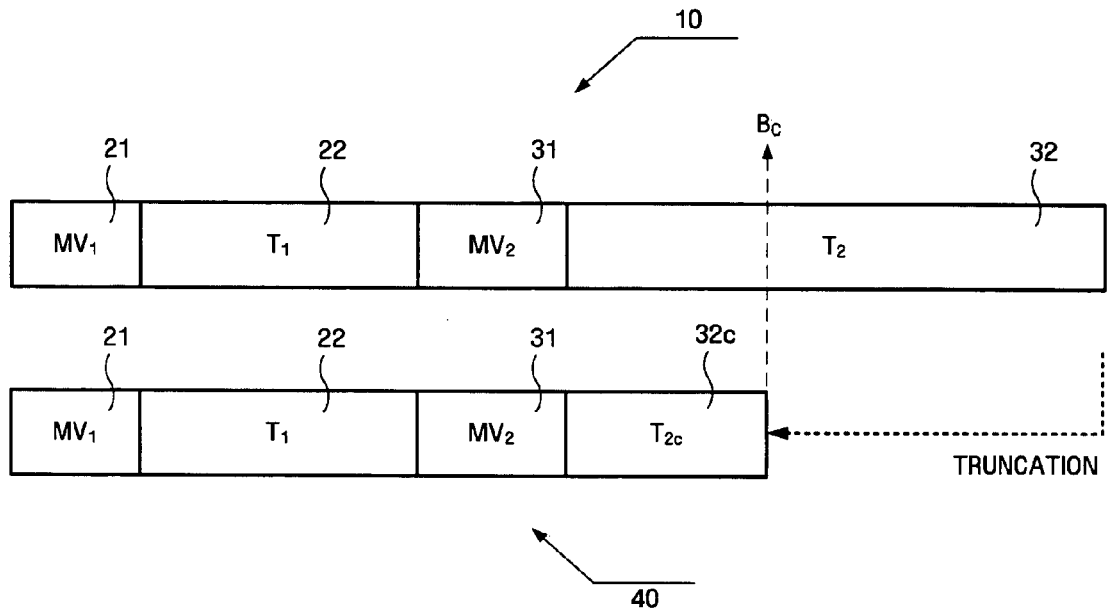
FIGS. 8A-8D illustrate a predecoding method according to a second exemplary embodiment of the present invention.
Figure 8B:
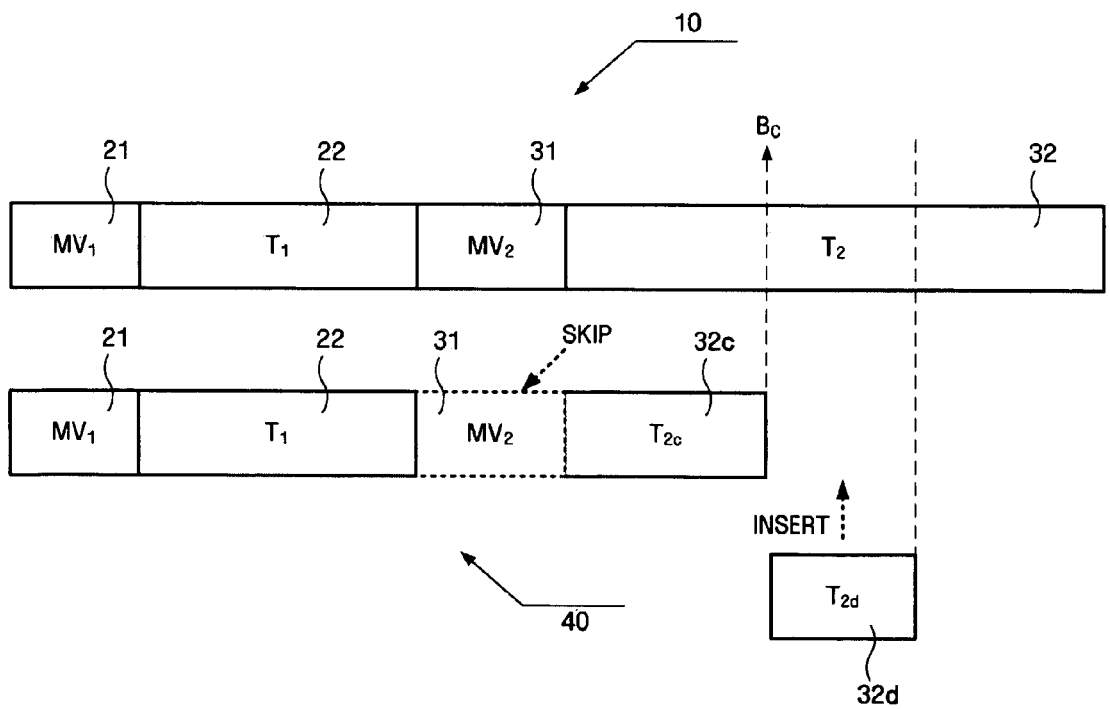
Figure 8C:
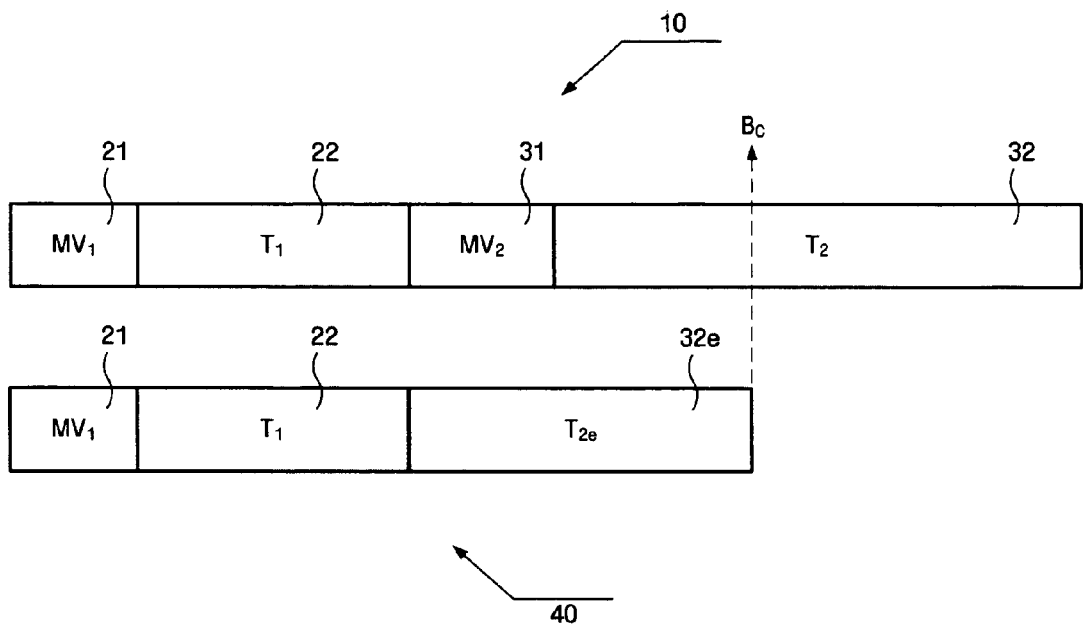
Figure 8D:
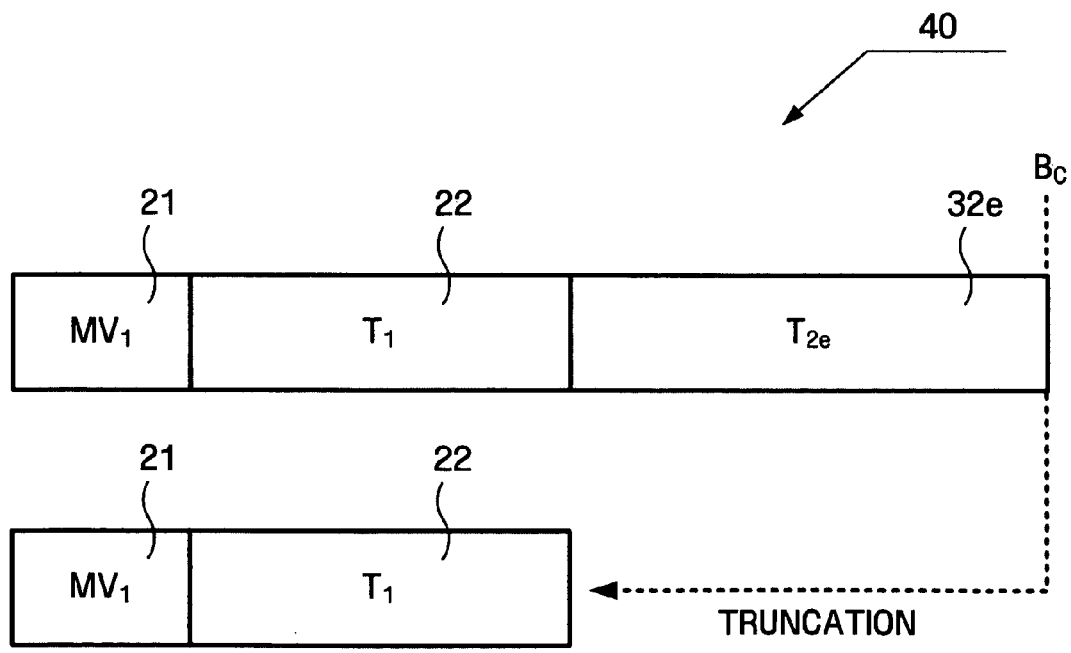

In a second exemplary embodiment, $MV_2$ 31 is skipped when the remaining bitstream meets critical bit-rate $B_C$ before reaching boundary bit-rate $B_B$. First, referring to FIG. 8A, $T_2$ 32 is truncated from the tail in order to meet a target bit-rate before reaching the critical bit-rate $B_C$. When the critical bit-rate $B_C$ is reached, the $MV_2$ 31 is skipped and $T_{2d}$ 32d corresponding to the size of $MV_2$ 31 is inserted into a portion of $T_2$ truncated, as shown in FIG. 8B. Then, the remaining portion of $T_2$ has the size of $T_{2c}$ 32c plus $T_{2d}$ 32d as shown in FIG. 8C. To further reduce a bit-rate to the target bit-rate, the $T_{2e}$ 32e is truncated from the tail as shown in FIG. 8D. Of course, this truncation also continues until all bits of $T_{2e}$ 32e are cut off.

Figure 9:
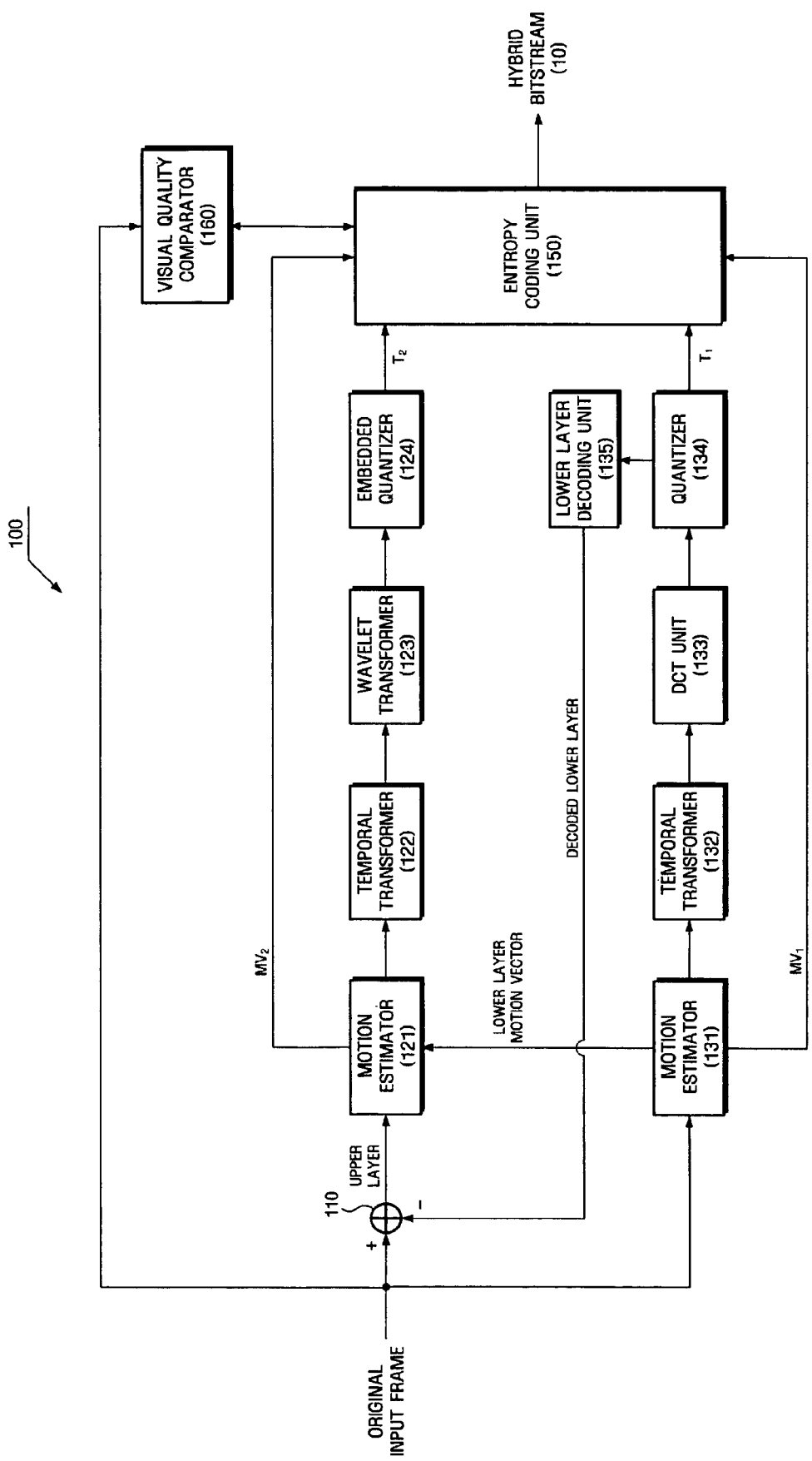
FIG. 9 is a block diagram of a video encoder according to an exemplary embodiment of the present invention.

FIG. 9 is a block diagram of a video encoder 100 according to an exemplary embodiment of the present invention.

Referring to FIG. 9, the video encoder 100 encodes an input video into a hybrid bitstream 10. The basic concept of generating the hybrid bitstream 10 is shown in the following Equation (1):

$$E = O - A^{-1} \cdot A(O) \quad (1)$$

where O is an original input video, A(·) is a function used to encode an original input video to have a minimum bit-rate using AVC coding, and A$^{-1}$(·) is a function used to decode an encoded video. Because the process of implementing the function A(·) involves lossy coding, the result of decoding an encoded video is not the same as the original input video O.

A difference E defined by Equation (1) is encoded using wavelet coding and the encoded result is represented by W(E). W(·) is a function used to encode a difference using wavelet coding. Thus, encoded texture information A(O) of a lower layer and encoded texture information W(E) of an upper layer can be obtained. Lower layer motion vector and upper layer motion vector are encoded using a different process (mainly lossless coding) than the texture information. The motion information and texture information of the lower and upper layers are then combined into the hybrid bitstream 10. Referring to FIG. 9, a subtractor 110 calculates a difference between an original input video and a lower layer frame reconstructed by a lower layer decoding unit 135 in order to generate an upper layer frame.

A motion estimator 121 performs motion estimation on the upper layer frame to obtain motion vectors of the upper layer frame. The motion estimation is the process of finding the closest block to a block in a current frame, i.e., a block with a minimum error. Various techniques including fixed-size block and hierarchical variable size block matching (HVSBM) may be used in the motion estimation. In this case, the motion estimator 121 uses motion vectors of the lower layer frame obtained by a motion estimator 131 to efficiently represent the motion vectors of the upper layer frame, in which redundancy has been removed.

A temporal transformer 122 uses the motion vectors obtained by the motion estimator 121 and a frame at a temporally different position than the current frame to generate a predicted frame and subtracts the predicted frame from the current frame to generate a temporal residual frame, thereby removing temporal redundancy. When the current frame is encoded without reference to any other frame, no motion vector is required and a temporal transform process using the predicted frame may be omitted. The temporal transform may be performed using Motion Compensation Temporal filtering (MCTF) or Unconstrained MCTF (UMCTF).

The wavelet transformer 123 performs wavelet transform on the temporal residual frame generated by the temporal transformer 122 or the upper layer frame output from the subtractor 110 to create a wavelet coefficient. Various wavelet filters such as a Haar filter, a 5/3 filter, and a 9/7 filter may be used for wavelet transform according to a transform method.

An embedded quantizer 124 quantizes the wavelet coefficient generated by the wavelet transformer 123 and represents a quantization coefficient T$_2$ in a form that can support SNR scalability. In this way, embedded quantization is used in wavelet coding to support SNR scalability.

Embedded quantization is suitable for use in a wavelet-based codec employing wavelet transform for spatial transform. For example, the embedded quantization may include encoding values above an initial threshold, encoding values above one-half the initial threshold, and repeating the above process by setting a new threshold equal to one-quarter the initial threshold. In this case, the quantization is performed using spatial correlation that is one of the main features of wavelet transform. Examples of embedded quantization techniques include Embedded ZeroTrees Wavelet (EZW), Embedded ZeroBlock Coding (EZBC), and Set Partitioning in Hierarchical Trees (SPIHT). The use of embedded quantization allows a user to arbitrarily truncate texture data from the tail according to circumstances.

Turning to FIG. 9, like in the encoding process for the upper layer frame, the lower layer frame is also subjected to motion estimation by the motion estimator 131 and temporal transform by a temporal transformer 132. However, the lower layer frame does not pass through the subtractor 110. The lower layer frame encoded using AVC coding can use an intra predictive mode defined in H.264 in combination with temporal transform.

A Discrete Cosine Transform (DCT) unit 133 performs DCT on a temporal residual frame generated by the temporal transform or an original input frame to create a DCT coefficient. The DCT may be performed for each DCT block. A quantizer 134 applies quantization to the DCT coefficient. Here, the quantization is the process of converting real-valued DCT coefficients into discrete values by dividing the range of coefficients into a limited number of intervals. When DCT is used for transform, embedded quantization is not applied unlike in the upper layer frame. The lower layer decoding unit 135 reconstructs a lower layer frame from a quantization coefficient T$_1$ generated by the quantizer 134 and provides the lower layer frame to the subtractor 110. The process of reconstructing the lower layer frame may involve inverse quantization, inverse DCT, and inverse temporal transform.

An entropy coding unit 150 losslessly encodes the quantization coefficients T$_1$ generated by the quantizer 134, the quantization coefficients T$_2$ generated by the embedded quantizer 124, the motion information MV$_1$ including the lower layer motion vector generated by the motion estimator 131, and the motion information MV$_2$ including an upper layer motion vector component generated by the motion estimator 121 into a hybrid bitstream 10. Various coding schemes such as Huffman Coding, Arithmetic Coding, and Variable Length Coding may be employed for lossless coding.

A visual quality comparator 160 compares a visual quality when portion of texture information T$_2$ of an upper layer bitstream 30 in the hybrid bitstream 10 is truncated with that when motion information of the upper layer bitstream 30 is skipped and bits saved by skipping of the motion information are allocated to the texture information T$_2$ as shown in FIG. 8 and finds a critical bit-rate B$_C$ when both visual qualities are the same. In the latter case, motion information of a lower layer bitstream is used in place of the skipped motion information of the upper layer bitstream 30. When the visual quality in the former case is better than that in the latter case, the texture information T$_2$ is further truncated. On the other hand, when the visual quality in the latter case is better than that in the former case, a smaller amount of the texture information T$_2$ is truncated. The above process is repeated until both the visual qualities are the same. The critical bit-rate B$_C$ can be recorded by a marker bit at a predetermined location of the hybrid bitstream 10 generated by the entropy coding unit 150.

Figure 10:
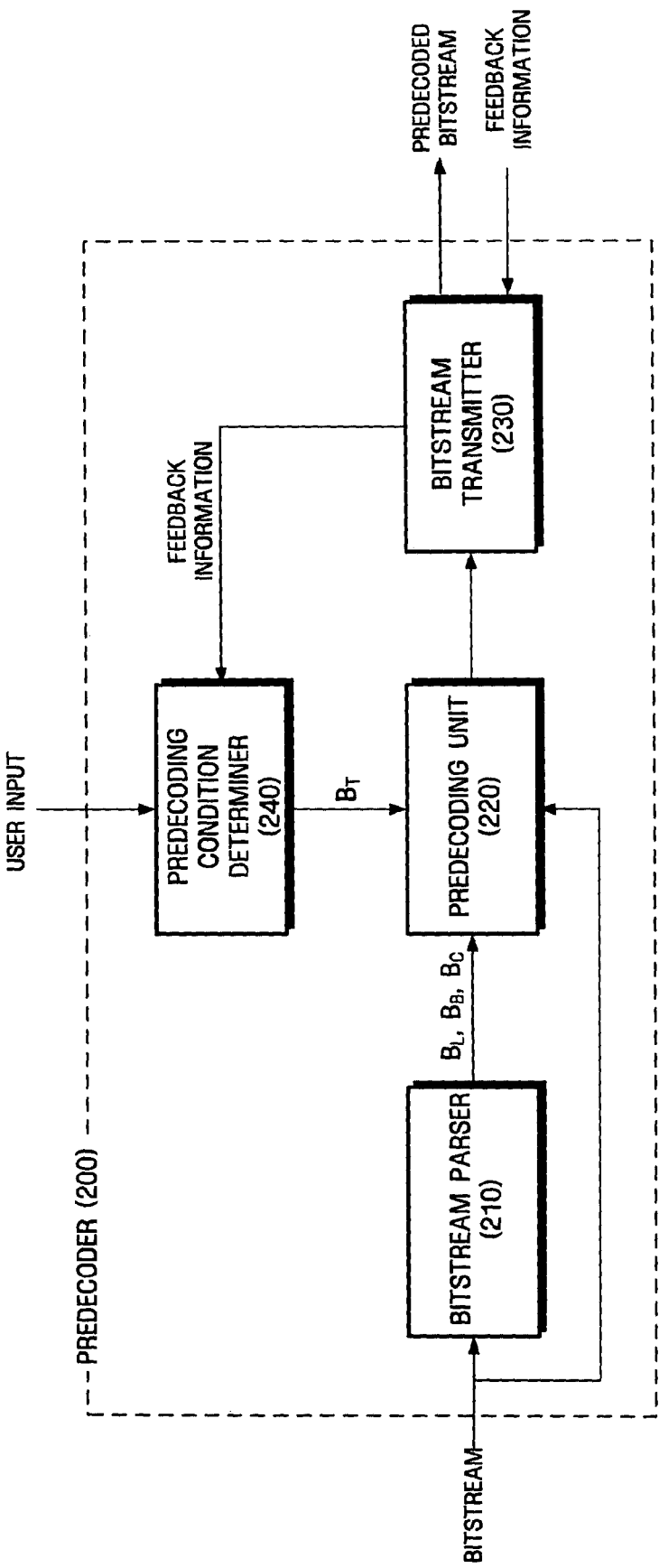
FIG. 10 is a block diagram of a predecoder according to an exemplary embodiment of the present invention.

FIG. 10 is a block diagram of a predecoder 200 according to an exemplary embodiment of the present invention. The predecoder 200 predecodes the hybrid bitstream 10 provided by the video encoder (100 of FIG. 9) and adjusts a SNR or bit-rate of the hybrid bitstream 10. Of source, predecoding refers to a process by which resolution, frame rate, and SNR are adjusted by extracting or truncating a portion of a bitstream. However, since a focus of the present invention is to implement SNR scalability, the predecoding as used hereinafter refers to the process of adjusting a SNR of bitstream. The predecoder 200 may actually be realized as a video stream server transmitting a scalable video stream suitably according to a variable network environment and be integrated into the video encoder 100.

Referring to FIG. 10, a bitstream parser 210 parses the hybrid bitstream 10 provided by the video encoder 100. In this case, the bitstream parser 210 obtains information about the positions of $MV_1$ 21, $T_1$ 22, $MV_2$ 31, and $T_2$ 32 in the hybrid bitstream 10 (hereinafter called 'position information') by parsing start bits of $MV_1$ 21, $T_1$ 22, $MV_2$ 31, and $T_2$ 32. The bitstream parser 210 also parses the lowest bit-rate $B_L$ and boundary bit-rate $B_B$ through the position information. When a marker bit indicating a critical bit-rate is recorded in the hybrid bitstream 10, the bitstream parser 210 parses the critical bit-rate $B_C$ as well and sends $B_L$, $B_B$, and $B_C$ to a predecoding unit 220.

A predecoding condition determiner 240 determines a predecoding condition, i.e., a target bit-rate to adapt to variable network circumstances according to a user's input. To achieve this, the predecoding condition determiner 240 may receive feedback information about available bit-rate from a video decoder receiving a bitstream from the predecoder 200. The video decoder reconstructing a video stream can be deemed as a client device receiving a video streaming service.

The predecoding unit 220 predecodes the bitstream according to the determined target bit-rate. The predecoding methods according to the first and second exemplary embodiments of the present invention described above will be described in more detail later with reference to FIGS. 12 and 13.

The bitstream transmitter 230 transmits a hybrid bitstream reconstructed by the predecoding unit 220 after adjusting a bit-rate, i.e., a predecoded bitstream 40 to the video decoder while receiving feedback information from the video decoder. The feedback information may contain information about available bit-rate $B_T$ measured when the video decoder receives the bitstream.

Figure 11:
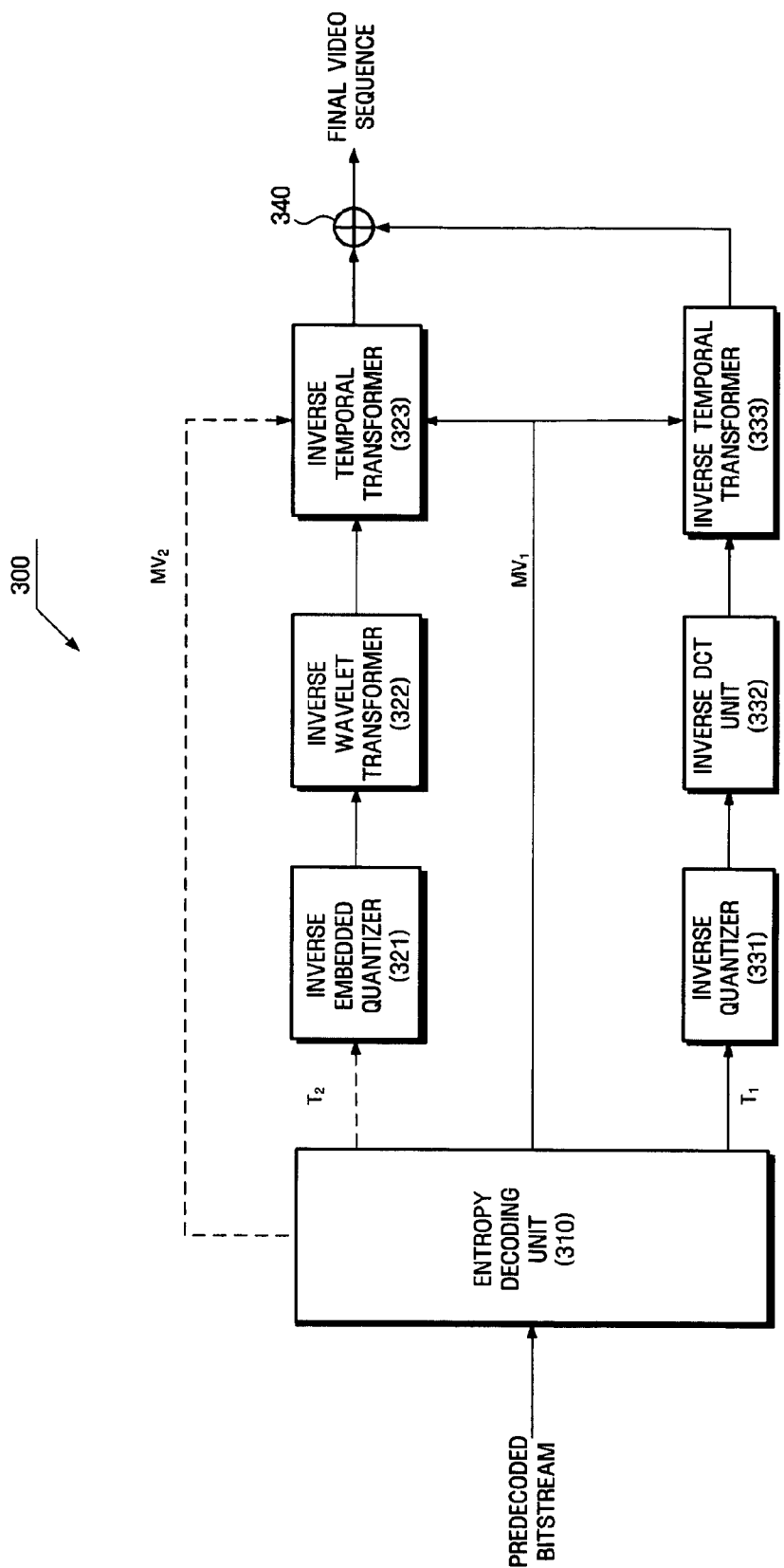
FIG. 11 is a block diagram of a video decoder according to an exemplary embodiment of the present invention.

FIG. 11 is a block diagram of a video decoder 300 according to an exemplary embodiment of the present invention.

Referring to FIG. 11, an entropy decoding unit 310 performs the inverse of entropy encoding and extracts lower layer data and upper layer data from an input bitstream (predecoded bitstream). The lower layer data may contain motion information $MV_1$ 21 and texture information $T_1$ 22 while the upper layer data may contain motion information $MV_2$ 31 and texture information $T_2$ 32. No upper layer data or only texture information $T_2$ 32 of the upper layer data may exist according to the result of predecoding.

An inverse quantizer 331 performs inverse quantization on the texture information $T_1$ 22. The inverse quantization is the inverse of the quantization process performed by the video encoder 100 and reconstructs transform coefficients using a quantization table used during the quantization process.

An inverse DCT unit 332 performs inverse DCT on the inversely quantized result. The inverse DCT is the inverse of the DCT performed by the video encoder 100. An inverse temporal transformer 333 reconstructs a lower layer video sequence from the inversely DCT-transformed result. To reconstruct the lower layer video sequence, the lower layer motion vector $MV_1$ 21 and the previously reconstructed lower layer frame are used to generate a motion-compensated frame that is then added to the inversely DCT-transformed result. Of course, an intra-frame that is not subjected to temporal transform at the video encoder 100 will be reconstructed by inverse intra prediction without undergoing inverse temporal transform. The reconstructed lower layer frame is then fed to an adder 340.

Likewise, the texture information $T_2$ 32 of the upper layer is fed to an inverse embedded quantizer 321.

The inverse embedded quantizer 321 performs inverse embedded quantization on texture information $T_2$ 32 of the upper layer. The inverse embedded quantization is the inverse of the quantization process performed by the video encoder 100.

An inverse wavelet transformer 322 performs inverse wavelet transform on the result obtained by the inverse embedded quantization. The inverse wavelet transform is the inverse of the wavelet transform (filtering) performed by the video encoder 100.

An inverse temporal transformer 323 reconstructs an upper layer video sequence from the inversely spatially transformed result. To reconstruct the upper layer frame, the upper layer motion vector $MV_2$ 31 is obtained to generate a motion-compensated frame that is then added to the inversely wavelet-transformed result. In this case, the inverse temporal transformer 323 determines whether $MV_2$ 31 exists. When $MV_2$ 31 does not exist, $MV_1$ 21 is used as such. Conversely, when the $MV_2$ 31 exists, an upper layer motion vector reconstructed using the $MV_1$ 21 and $MV_2$ 31 is used. If the $MV_2$ 31 is generated at the video encoder 100 using the difference between the upper layer motion vector and the lower layer motion vector, the upper layer motion vector can be reconstructed by adding the upper layer motion vector component contained in the $MV_2$ 31 to the lower layer motion vector contained in the $MV_1$ 21. It will be readily apparent that an intra-frame that is not subjected to temporal transform at the video encoder 100 will not undergo inverse temporal transform.

Lastly, the adder 340 adds the reconstructed lower layer video sequence to the reconstructed lower layer video sequence in order to reconstruct a final video sequence.

Figure 12:
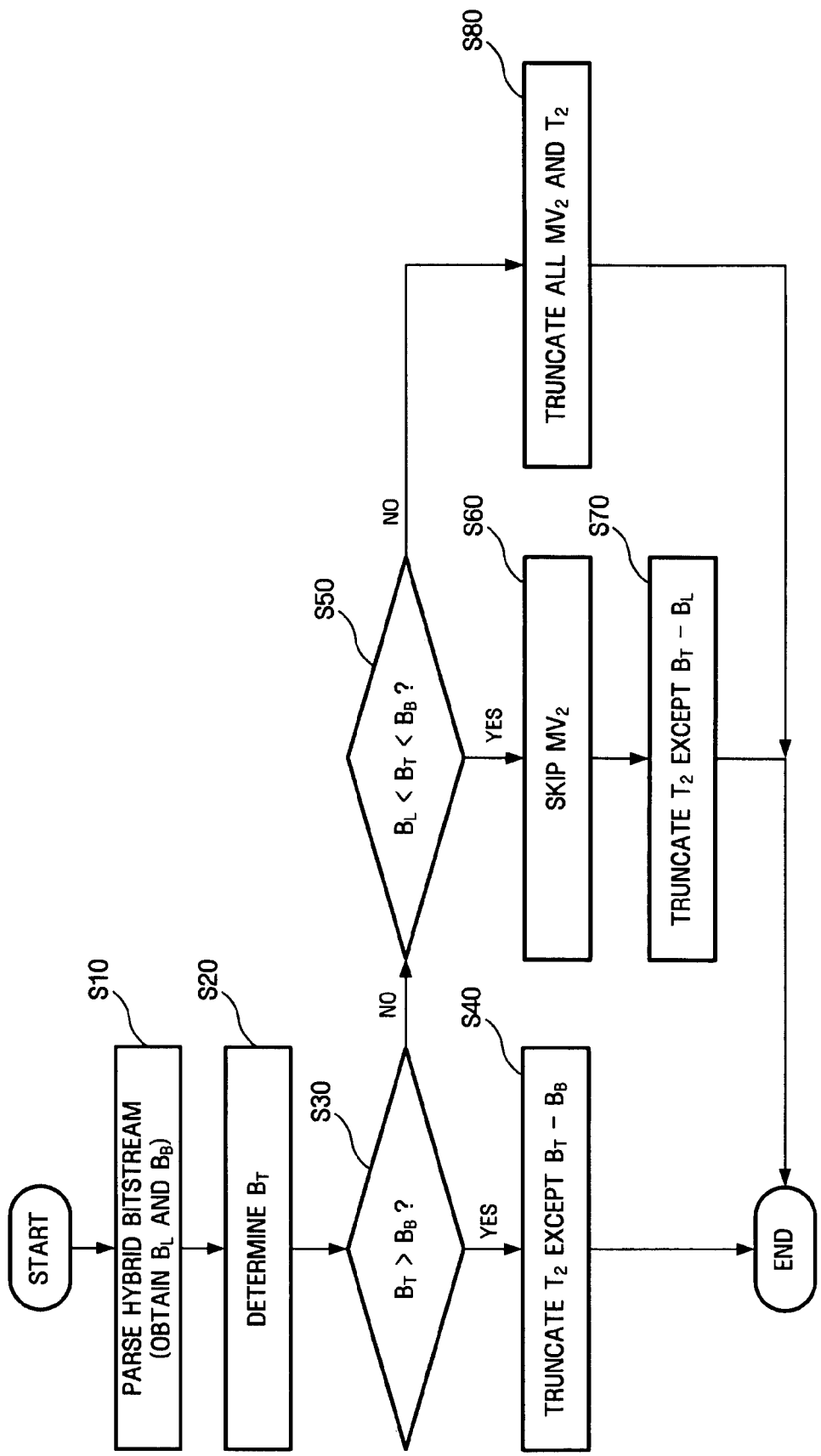
FIG. 12 is a detailed flowchart illustrating a predecoding process according to a first exemplary embodiment of the present invention.

FIG. 12 is a detailed flowchart illustrating a predecoding process according to a first exemplary embodiment of the present invention.

Referring to FIG. 12, in step S10, the bitstream parser (210 of FIG. 10) parses a hybrid bitstream 10 provided by the video encoder (100 of FIG. 9) to obtain lowest bit-rate $B_L$ and boundary bit-rate $B_B$ that are then sent to the predecoding unit 220. Then, in step S20, the predecoding condition determiner 240 determines a predecoding condition, i.e., a target bit-rate $B_T$ according to variable network circumstances or a user's input.

The predecoding unit 220 performs predecoding according to the bit-rates $B_L$, $B_B$, and $B_T$. The predecoding process is performed in steps S30 to S80. In step S40, when $B_T$ is higher than $B_B$ (yes in step S30), the predecoding unit 220 truncates all bits of upper layer texture information $T_2$ 32 contained in the hybrid bitstream 10 except bits corresponding to $B_T$–$B_B$. In other words, a portion of the upper layer texture information $T_2$ 32 corresponding to ($B_T$–$B_B$) subtracted from the size of $T_2$ 32 is truncated from the tail.

When $B_T$ is between $B_L$ and $B_B$ (yes in step S50), the predecoding unit 220 skips upper layer motion information $MV_2$ 31 contained in the hybrid bitstream 10 in step S60 and truncates all bits of the upper layer texture information $T_2$ 32 except bits corresponding to $B_T$–$B_L$ in step S70. In other words, a portion of the upper layer texture information $T_2$ 32 corresponding to ($B_T$–$B_L$) subtracted from the size of $T_2$ 32 is truncated from the tail. As a result of performing the step S70, the remaining portion of $T_2$ 32 further contains bits corresponding to $B_B$–$B_L$ saved by skipping the motion information $MV_2$ 31.

Lastly, in step S80, when $B_T$ is lower than $B_L$ (no in the step S50), the predecoding unit 220 simply truncates all the upper layer data $MV_2$ 31 and $T_2$ 32 because it cannot truncate the lower layer data to ensure a minimum AVC layer bitstream portion.

Figure 13:
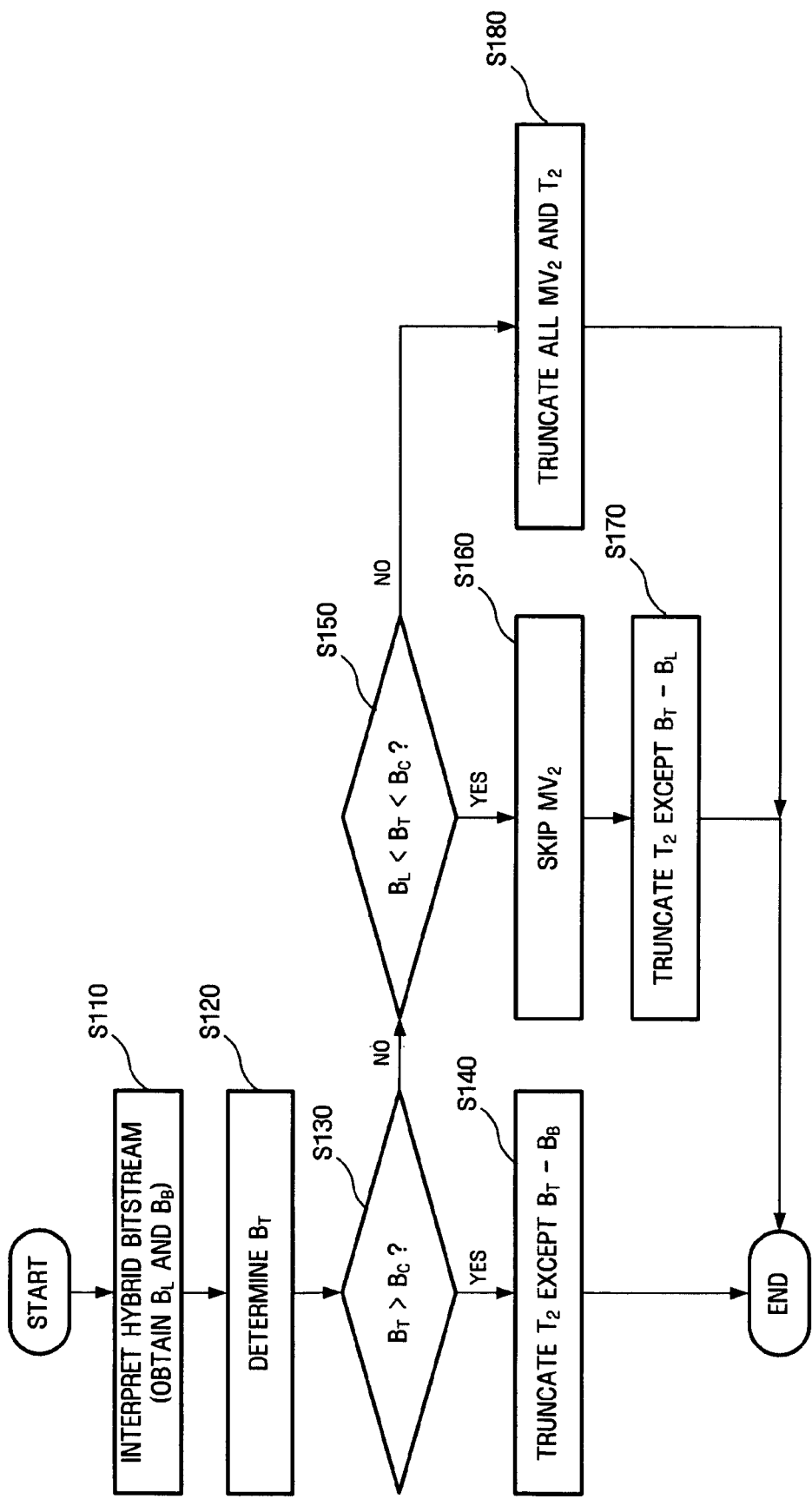
FIG. 13 is a detailed flowchart illustrating a predecoding process according to a second exemplary embodiment of the present invention.

FIG. 13 is a detailed flowchart illustrating a predecoding process according to a second exemplary embodiment of the present invention.

Referring to FIG. 13, in step S110, the bitstream parser (210 of FIG. 10) parses a hybrid bitstream 10 provided by the video encoder (100 of FIG. 9) to obtain lowest bit-rate $B_L$ and boundary bit-rate $B_B$ that are then sent to the predecoding unit 220. A critical bit-rate $B_C$ may be contained in the hybrid bitstream 10 and received from the video encoder 100 or calculated directly by the predecoding unit 220. When the $B_C$ is contained in the hybrid bitstream 10, the bitstream parser 210 parses $B_C$ as well and sends the same to the predecoding unit 220.

Then, in step S120, the predecoding condition determiner 240 determines a predecoding condition, i.e., a target bit-rate $B_T$ according to a user's input or variable network circumstances.

The predecoding unit 220 performs predecoding according to the bit-rates $B_L$, $B_C$, and $B_T$. The predecoding process is performed in steps S130 to S180. The critical bit-rate $B_C$ may be received from the bitstream parser 210 or determined directly by the predecoding unit. For example, a ratio between $MV_2$ 31 and $T_2$ 32 is predetermined and a bit-rate obtained when a ratio between the $MV_2$ 31 and a portion of $T_2$ 32 remaining after truncation reaches the predetermined ratio is called a critical bit-rate. The predecoding unit 220 may determine a critical bit-rate using various other methods that will be apparent to those skilled in the art.

In step S140, when $B_T$ is higher than $B_C$ (yes in step S130), the predecoding unit 220 truncates all bits of upper layer texture information $T_2$ 32 contained in the hybrid bitstream 10 except bits corresponding to $B_T$–$B_B$. In other words, a portion of the upper layer texture information $T_2$ 32 corresponding to ($B_T$–$B_B$) subtracted from the size of $T_2$ 32 is truncated from the tail.

When $B_T$ is between $B_L$ and $B_C$ (yes in step S150), the predecoding unit 220 skips upper layer motion information $MV_2$ 31 contained in the hybrid bitstream 10 in step S160 and truncates all bits of the upper layer texture information $T_2$ 32 except bits corresponding to $B_T$–$B_L$ in step S170. In other words, a portion of the upper layer texture information $T_2$ 32 corresponding to ($B_T$–$B_L$) subtracted from the size of $T_2$ 32 is truncated from the tail. As a result of performing the step S170, the remaining portion of $T_2$ 32 further contains bits corresponding to $B_B$–$B_L$ saved by skipping the motion information $MV_2$ 31.

Lastly, in step S180, even when $B_T$ is lower than $B_L$ (no in the step S150), the predecoding unit 220 simply truncates all the upper layer data $MV_2$ 31 and $T_2$ 32 because it cannot truncate the lower layer data.

According to exemplary embodiments of the present invention, SNR scalability can be adjusted efficiently in a hybrid bitstream.

In addition, exemplary embodiments of the present invention provide methods and apparatuses for adjusting SNR scalability considering both texture data and motion data.

The present invention can also be implemented on a computer by executing a computer program on a recording medium.

Although the present invention has been described in connection with exemplary embodiments, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A method for predecoding a hybrid bitstream including a lower layer bitstream and an upper layer bitstream obtained by encoding a video with a predetermined resolution according to a target bit-rate, the method comprising:

obtaining a first bit-rate for a boundary between the lower layer bitstream and the upper layer bitstream and a second bit-rate for a boundary between motion information and texture information of the upper layer bitstream from the hybrid bitstream;

determining, using a computer, the target bit-rate according to variable network circumstances; and when the target bit-rate is between the first bit-rate and the second bit-rate, skipping the motion information of the upper layer bitstream and truncating all bits of the texture information of the upper layer bitstream from a tail end of the upper layer bitstream, except bits corresponding to a difference between the target bit-rate and the first bit-rate.

2. The method of claim 1, further comprising truncating all bits of the texture information of the upper layer bitstream from the tail end of the upper layer bitstream, except bits corresponding to a difference between the target bit-rate and the second bit-rate when the target bit-rate is higher than the second bit-rate.

3. The method of claim 1, further comprising truncating the upper layer bitstream when the target bit-rate is lower than the first bit-rate.

4. The method of claim 1, wherein texture information of the lower layer bitstream is encoded using Advanced Video Coding (AVC) while the texture information of the upper layer bitstream is encoded using wavelet coding.

5. The method of claim 4, wherein the texture information of the upper layer bitstream is generated by encoding a difference between a decoded version of the lower layer bitstream and an original input frame using the wavelet coding.

6. An apparatus for predecoding a hybrid bitstream including a lower layer bitstream and an upper layer bitstream obtained by encoding a video with a predetermined resolution according to a target bit-rate, the apparatus comprising:

a bitstream parser which obtains a first bit-rate for a boundary between the lower layer bitstream and the upper layer bitstream and a second bit-rate for a boundary between motion information and texture information of the upper layer bitstream from the hybrid bitstream;

a target bit-rate determiner which determines the target bit-rate according to variable network circumstances; and a predecoding unit which skips the motion information of the upper layer bitstream and truncates all bits of the texture information of the upper layer bitstream from a tail end of the upper layer bitstream, except bits corresponding to a difference between the target bit-rate and the first bit-rate when the target bit-rate is between the first bit-rate and the second bit-rate.

7. A non-transitory computer-readable recording medium having a computer program recorded therein, the program for executing the method of claim 1.

* * * * *